United States Patent [19]

Barbier et al.

[11] Patent Number: 5,209,066
[45] Date of Patent: May 11, 1993

[54] COUNTER FLOW COMBUSTION CHAMBER FOR A GAS TURBINE ENGINE

[75] Inventors: Gérard Y. G. Barbier, Morangis; Xavier M. H. Bardey, Chartrettes; Michel A. A. DeSaulty, Vert Saint Denis; Serge M. Meunier, Le Chatelet en Brie, all of France

[73] Assignee: Societe Nationale d'Etude et de Construction de Moteurs, Paris, France

[21] Appl. No.: 806,297

[22] Filed: Dec. 13, 1991

[30] Foreign Application Priority Data

Dec. 19, 1990 [FR] France .................. 90 15911

[51] Int. Cl.$^5$ .............................................. F02C 1/00
[52] U.S. Cl. ........................................ 60/732; 60/752; 60/754
[58] Field of Search ............... 60/732, 736, 752, 754

[56] References Cited

U.S. PATENT DOCUMENTS

| | | | |
|---|---|---|---|
| 3,372,541 | 3/1968 | Smith | 60/39.65 |
| 3,381,471 | 5/1968 | Szydlowski | 60/752 |
| 4,040,251 | 8/1977 | Heftmann et al. | 60/39.36 |
| 4,040,252 | 8/1977 | Mosier et al. | 60/39.36 |
| 4,195,476 | 4/1980 | Wood | 60/754 |
| 4,203,283 | 5/1980 | Weiler | 60/736 |
| 4,280,329 | 7/1981 | Rackley et al. | 60/754 |
| 4,651,534 | 3/1987 | Stroem | 60/732 |

FOREIGN PATENT DOCUMENTS

| | | |
|---|---|---|
| WO 90/07087 | 6/1990 | Int'l Pat. Institute . |
| 2010407 | 6/1979 | United Kingdom . |
| 85/00199 | 1/1985 | World Int. Prop. O. .......... 60/736 |

OTHER PUBLICATIONS

Energygram, *A Multifuel, Low-Emission Gas Turbine*, 2301 N.T.I.S. Tech Notes (1984) Apr., A-K, Springfield, Va. USA.

*Primary Examiner*—Richard A. Bertsch
*Assistant Examiner*—Howard R. Richman
*Attorney, Agent, or Firm*—Bacon & Thomas

[57] ABSTRACT

The present invention relates to a combustion chamber having a counter-flow arrangement in which a first chamber portion mixes the fuel with the primary oxidizer, which mixture is ignited and burned in the first chamber portion. The exhaust gases from the first chamber portion pass into a second chamber portion in which dilution oxidizer air is added to the burned gases. The orientations of the first chamber portion and the second chamber portion are such that the gases pass through the chamber portions in substantially opposite directions, in a counter-flow arrangement. The first chamber portion in which the combustion takes place, provides only primary oxidizer to the fuel mixture, there being no further communication between the interior of the first chamber portion and the oxidizer air supply. This prevents the leaning of the fuel/air mixture in order to reduce the emissions of nitrogen oxide. The mixing of secondary oxidizer air with the exhaust gases takes place solely in the second chamber portion.

5 Claims, 1 Drawing Sheet

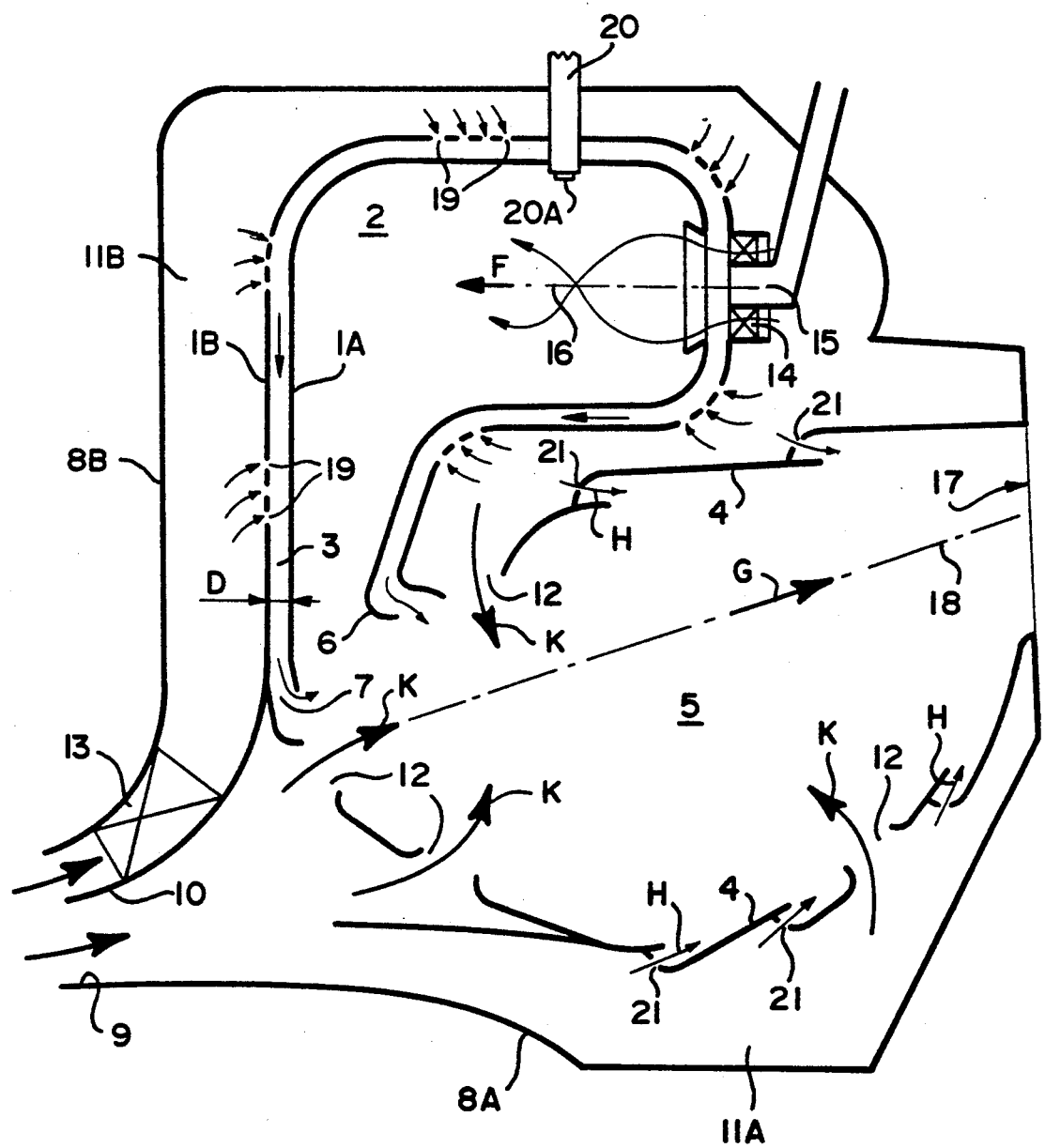

COUNTER FLOW COMBUSTION CHAMBER FOR A GAS TURBINE ENGINE

BACKGROUND OF THE INVENTION

The present invention relates to a combustion chamber for a gas turbine engine, more particularly such a combustion chamber having a counter-flow arrangement to minimize harmful pollutants in the exhaust gases.

U.S. Pat. No. 4,040,252 to Mosier et al. discloses a combustion device for a power plant which comprises a first enclosure in which a fuel/oxygen mixture is ignited and burned, and a second chamber through which the exhaust gases from the first combustion chamber pass. The primary combustion air is added to the first chamber upstream of the ignition device, while additional air is added to the first combustion chamber downstream of the combustion device. Additional air is added to the exhaust gases after they have passed through the second chamber portion. The gases pass through the first chamber in a direction generally opposite from which they pass through the second chamber.

In this device, as is typical of the known counterflow combustion chambers, a dilution gas, which may be part of the intake air, enters the first chamber portion to dilute the exhaust gases of combustion. As a result of this addition of dilution air, the fuel/oxidizer mixture becomes leaner and the combustion process is slowed. This promotes the formation of nitrogen oxide in the exhaust gases, thereby increasing air pollution.

SUMMARY OF THE INVENTION

The present invention relates to a combustion chamber having a counter-flow arrangement in which a first chamber portion mixes the fuel with the primary oxidizer, which mixture is ignited and burned in the first chamber portion. The exhaust gases from the first chamber portion pass into a second chamber portion in which dilution air is added to the burned gases. The orientations of the first chamber portion and the second chamber portion are such that the gases pass through the chamber portions in substantially opposite directions, in a counter-flow arrangement.

The first chamber portion in which the combustion takes place, provides only primary oxidizer to the fuel mixture, there being no further communication between the interior of the first chamber portion and the oxidizer air supply. This prevents the leaning of the fuel/air mixture in order to reduce the emissions of nitrogen oxide.

The mixing of secondary oxidizer air with the exhaust gases takes place solely in the second chamber portion.

The first chamber portion is bounded by a double wall structure in which the spaced-apart walls define a cooling passage between them. The outer, cold wall communicates with an oxidizer chamber to allow a portion of the oxidizer gas to pass between the walls to act as a coolant for cooling the inner, hot wall. The gases, after passing between the walls, exit into the second chamber portion. No portion of the cooling gases passing between the walls enter the first chamber portion. This prevents dilution of the fuel/oxygen mixture in the first combustion chamber portion.

An enclosure enclosing the first and second chamber portions bounds an oxidizer gas chamber, which may be separated by a partition adjacent to the oxidizer gas chamber inlet such that a portion of the oxidizer gas chamber surrounds the first chamber portion and a second portion of the oxidizer gas chamber encloses the second chamber portion. A compressor may be located in communication with the first oxidizer gas chamber portion to compress the oxidizer gas in this portion of the oxidizer gas chamber.

The device according to the invention markedly decreases the formation of nitrogen oxides in the exhaust gases by enabling the combustion in the first combustion chamber portion to take place very rapidly with a rich fuel/air mixture. The rich fuel/air mixture is preserved by preventing any dilution by the oxidizer gas. As the exhaust gases from the first combustion chamber portion pass into the second combustion chamber portion, they are diluted very rapidly by the presence of the secondary oxidizer gases, thus minimizing the formation of the nitrogen oxides.

BRIEF DESCRIPTION OF THE DRAWING

The single FIGURE is a longitudinal, cross-sectional view of the combustion chamber according to the present invention.

DETAILED DESCRIPTION OF THE PREFERRED EMBODIMENT

As can be seen in the FIGURE, the first combustion chamber portion is bounded by a double wall structure consisting of an inner, hot wall 1A which bounds the first combustion chamber portion 2, and an outer, cold wall 1B displaced from the inner, hot wall 1A a distance D. A cooling passage 3 is thus defined between the inner and outer walls 1A and 1B.

A wall 4 bounds the second combustion chamber portion 5 and has an inlet communicating with the first combustion chamber portion 2 via constricted passage 6. The cooling passage 3 also has an outlet 7 which communicates directly with the second combustion chamber portion 5.

Walls 8A and 8B enclose the first and second combustion chamber portions 2 and 5, and define therewith an oxidizing gas chamber 11A and 11B. The oxidizing gas chamber has an intake opening 9 which may have a partition 10 extending between the intake 9 and the outer wall 1B of the first combustion chamber portion 2.

Portion 8A of the enclosing wall partly surrounds wall 4 of the second combustion chamber portion 5 and defines between them a sub-chamber 11A of the oxidizer gas chamber. The oxidizer gas passes into the second combustion chamber portion 5 through oxidizer intake orifices 12 defined by the wall 4 as illustrated by arrows K. This oxidizer gas is used to quickly dilute the exhaust gases emanating from the first combustion chamber portion 2.

Wall 8B of the oxidizer gas chamber structure, together with the outer, cold wall 1B defines a sub-chamber 11B of the oxidizer gas chamber. As illustrated in the figure, a compressor device 13 may be present in the intake portion of the sub-chamber 11B in order to increase the pressure of the oxidizer around the first combustion chamber portion 2. If desired, the compressor device 13 may be eliminated.

The first combustion chamber portion 2 communicates with the oxidizer gas chamber solely through the primary oxidizer intake 14 which surrounds the fuel injector nozzle 15. The injection of the fuel and the oxidizer air takes place substantially symmetrically about axis 16 of the first combustion chamber portion 2.

The fuel/air mixture as well as the burned gases travel in the direction of arrow F and exit from the first combustion chamber portion 2 through restricted passageway 6. No burned gas dilution takes place within the first combustion chamber portion 2, since the only oxidizer gas entering this chamber portion passes through the primary oxidizer intake orifices 14.

The burned gases and excess fuel are mixed with the oxidizer gas passing through the secondary oxidizer intake orifices 12 and with the oxidizer gas exiting through opening 7 after having passed through the passageway 3. These gases pass through the second combustion chamber portion 5 along the axis 18 in the general direction of arrow G. The gases pass through the outlet 17 of the second combustion chamber portion 5. The flow directions in the first combustion chamber portion 2 and the second combustion chamber portion 5 are substantially in opposite directions in a counter-flow configuration.

The outer, cold wall 1B defines a plurality of perforations 19 enabling the oxidizer gas to pass from the sub-chamber 11B into the passageway 3. The oxidizer passing through the passageway 3 toward the opening 7 serves to cool the inner, hot wall 1A. One or more spark plugs 20 extend into the first combustion chamber portion 2 such that its electrode 20A may ignite the fuel/oxidizer mixture within the combustion chamber portion 2.

Wall 4 also defines a plurality of cooling openings 21 which allow a portion of the oxidizer gas to flow in the direction of arrows H along the inner side of the wall 4 in order to form a cooling film of oxidizer air along the wall surface.

It is well known that the maximum production of nitrogen oxides occur when the fuel/oxidizer air mixture is stoichiometric. The production of such nitrogen oxides decreases notably on either side of this maximum, in a bell-shaped curve. In the present device, the actual combustion takes place with a rich fuel/air mixture in excess of the stoichiometric ratio and the burned gases are evacuated while being diluted to a mixture which is less than stoichiometric. Thus, the emission of the nitrogen oxides are decreased during both stages of the combustion process.

The combustion in the first combustion chamber portion 2 is carried out with a rich fuel/air mixture such that the burned gases are low in nitrogen oxides. The moment the burned gases leave the first combustion chamber portion 2, they are mixed with additional oxidizer air passing through the orifices 12 in the direction of arrows K to produce a very lean fuel/air mixture.

The design of the counter-flow combustion chamber according to this invention not only reduces the pollution of nitrogen oxides, but is more compact than known designs. The first combustion chamber portion 2 and the second combustion portion 5 are located substantially in the same plane extending generally perpendicular to the longitudinal axis of the gas turbine engine which minimizes the length of the engine. The transverse dimensions of the combustion chamber are also minimized by having a portion of the wall 4 which defines the second combustion chamber portion 5, also constitute the wall defining the sub-chamber 11B of the oxidizer gas chamber.

The foregoing description is provided for illustrative purposes only and should not be construed as in any way limiting this invention, the scope of which is defined solely by the appended claims.

We claim:

1. A combustion chamber for a gas turbine engine comprising:
    a) first wall means defining a first chamber portion having a primary oxidizer inlet and a first outlet, wherein the first wall comprises:
        i) an inner, hot wall;
        ii) an outer, cold wall surrounding the inner, hot wall and spaced therefrom so as to define a cooling passage therebetween; and,
        iii) a plurality of perforations defined by the outer, cold wall and communicating with an oxidizer gas chamber so as to allow oxidizer gas to pass through the cooling passage;
    b) fuel injection means operatively associated with the first wall means so as to inject fuel into the first chamber portion to form a fuel/oxidizer mixture;
    c) ignition means operatively associated with the first chamber portion so as to ignite the fuel/oxidizer mixture in the first chamber portion to produce exhaust gases;
    d) second wall means defining a second chamber portion having a second inlet and a second outlet, the second chamber portion oriented such that the second inlet communicates with the first outlet such that the exhaust gases travel in substantially opposite directions through the first and second chamber portions;
    e) third wall means surrounding the first and second wall means so as to define therebetween an oxidizer gas chamber, the third wall means defining a third inlet communicating with a source of oxidizer gas, the oxidizer gas chamber communicating with the primary oxidizer inlet; and,
    f) at least one secondary oxidizer intake orifice defined by the second wall means such that the oxidizer gas is admitted through the at least one secondary oxidizer intake orifice to only the second chamber portion.

2. The combustion chamber of claim 1 wherein the first wall means further defines an outlet for the cooling passage communicating solely with the second chamber portion.

3. The combustion chamber of claim 1 further comprising a plurality of cooling openings defined by the second wall means so as to allow oxidizer gas from the oxidizer gas chamber to pass through the second wall means into the second chamber portion to cool the second wall means.

4. The combustion chamber of claim 1 further comprising a partition located in the third inlet and connected to the first wall means so as to divide the oxidizer gas chamber into first and second sub-chambers, the first sub-chamber enclosing the first wall means and the second sub-chamber communicating with the second chamber portion.

5. The combustion chamber of claim 4 further comprising compressor means operatively associated with the first sub-chamber to compress the oxidizer gas in the first sub-chamber.

* * * * *